(12) United States Patent
Lubas et al.

(10) Patent No.: US 10,945,326 B2
(45) Date of Patent: Mar. 9, 2021

(54) CONFIGURABLE LIGHT SENSOR COMPRISING A PHOTOCELL ARRAY

(71) Applicant: Sway sp. z o.o., Cracow (PL)

(72) Inventors: Robert Mieczyslaw Lubas, Przysieki (PL); Szymon Slupik, Cracow (PL); Maciej Witalinski, Jaworzno (PL)

(73) Assignee: Sway sp. z o.o., Cracow (PL)

(*) Notice: Subject to any disclaimer, the term of this patent is extended or adjusted under 35 U.S.C. 154(b) by 344 days.

(21) Appl. No.: 16/168,755

(22) Filed: Oct. 23, 2018

(65) Prior Publication Data
US 2020/0128642 A1    Apr. 23, 2020

(51) Int. Cl.
*H05B 47/00* (2020.01)
*H05B 47/11* (2020.01)
*H05B 41/392* (2006.01)
*H05B 47/19* (2020.01)

(52) U.S. Cl.
CPC ......... *H05B 47/11* (2020.01); *H05B 41/3921* (2013.01); *H05B 47/19* (2020.01)

(58) Field of Classification Search
CPC ........ H05B 47/00; H05B 47/11; H05B 47/19; H05B 47/195; H05B 41/3921
See application file for complete search history.

(56) References Cited

U.S. PATENT DOCUMENTS

| | | | |
|---|---|---|---|
| 5,026,153 A | 6/1991 | Suzuki et al. | |
| 7,592,583 B2 | 9/2009 | Page et al. | |
| 7,683,301 B2 | 3/2010 | Papamichael et al. | |
| 9,041,941 B2 | 5/2015 | Morbee et al. | |
| 9,961,750 B2 * | 5/2018 | Leinen | H05B 45/10 |
| 10,656,008 B2 * | 5/2020 | Lubas | G01J 1/0228 |
| 2013/0342852 A1 | 12/2013 | Fujimoto | |

OTHER PUBLICATIONS

Notice of Allowance issued in U.S. Appl. No. 16/168,757, dated Jan. 17, 2020.
Office action issued in U.S. Appl. No. 16/168,757, dated Nov. 27, 2019.
"Restriction and/or election requirement," issued in U.S. Appl. No. 16/168,757, dated Aug. 5, 2019.

* cited by examiner

*Primary Examiner* — Kevin K Pyo
(74) *Attorney, Agent, or Firm* — McGeary Cukor LLC; Kenneth Ottesen; Jason Paul DeMont

(57) ABSTRACT

A configurable light sensor comprising an array of photocells. The light sensor measures ambient light reflected from a surface in area to be monitored. A lens directs the light onto the array of photocells. A microcontroller reads each individual photocell and processes the signals from the photocells according to one or more of the methods disclosed herein. The light sensor is configurable in that the area that monitored by the light sensor is customized to match the area lit by an associated light source. The configuring process defines an active area to be monitored, by determining which subset of photocells in the array, referred to as the active set of photocells, corresponds to the area being illuminated by the light fixture. The light sensor is subsequently able to monitor the defined active area and to report sensor output values based on measurements made from the photocells monitoring the active area.

20 Claims, 9 Drawing Sheets

Connected Lighting Network 200

CONFIGURABLE LIGHT SENSOR COMPRISING A PHOTOCELL ARRAY

CROSS REFERENCE TO RELATED APPLICATIONS

This application is related to "System and Method for Discovering the Topology of Devices within a Building Automation and Control System," U.S. application Ser. No. 16/168,757, filed on the same day as the present application and incorporated by reference herein.

FIELD OF THE INVENTION

The present invention relates to building automation and control in general, and, more particularly, to a configurable light sensor comprising a photocell array.

BACKGROUND OF THE INVENTION

"Commercial building automation," or "commercial automation," refers to the use of computer and information technology to control commercial building systems, such as lighting, HVAC, audio-visual, smoke detection, security, and shading, among others. Using specialized hardware and control logic, building devices can monitor their environment and can be controlled automatically. Although commercial automation has been available at some level of sophistication for some time, it steadily becomes more practical, both from a technological and cost perspective.

Lighting automation, in particular, has evolved over time. Lighting systems now exist in which luminaires that comprise control logic and controllable lamps are networked together, in what is sometimes referred to as "connected lighting" or networked "smart lighting." In such a network of "smart nodes," the sensors that are associated with the luminaires collect data about the local environment, such as data related to occupancy and data related to ambient lighting in the vicinity of the luminaires. The networked sensors and luminaires communicate with one other and adjust the light output of the lamps via the control logic, in some cases based on the sensor data.

FIG. 1 in the prior art depicts sensor node 101-1 and luminaire node 101-2. The two nodes are shown according to how they are situated within building 100, according to a floor plan of a particular room. The nodes communicate with each another and possibly with other connected nodes that are not depicted, such as other sensor nodes and luminaires.

Sensor node 101-1 comprises an optical system and a photocell to measure reflected light. The optical system comprises a lens with an aperture, or a focusing mirror, or other device configured to direct the reflected light onto the photocell. The photocell senses the reflected light and provides a representative electrical signal to a controller in order to make measurements. In some cases, the sensor node might comprise more than one photocell, typically with different viewing angles in order to subtract out changes in the environment that is being monitored.

Luminaire node 101-2 provides light to illuminated area 102-2 according to a particular minimum illuminance within the area. Sensor node 101-1 comprising one or more photocells monitors area 102-1 for ambient light level. Based on the ambient light level measured by sensor node 101-1 within monitored area 102-1, sensor node 101-1 can transmit information to luminaire 101-2, and possibly to other luminaire nodes as well, so that the one or more luminaires can adjust their lighting output accordingly.

As depicted, there is a mismatch between monitored area 102-1 and illuminated area 102-2. Certain techniques exist in the prior art that can be used to mitigate the mismatch. For example, the sensor can be repositioned better in relation to the luminaire. Also, more luminaires or sensors, or both, can be introduced into the room.

SUMMARY OF THE INVENTION

The problem with at least some light sensors and light fixtures in the prior art is that there is often a mismatch between the area monitored by the sensor and the area illuminated by the fixture. Although there are certain techniques that can be used to mitigate the mismatch, these techniques typically have disadvantages. For example, they might require a repositioning of the sensors or an installation of additional sensors or light fixtures, or both. These techniques can be costly and time-consuming.

The present invention relates to a configurable light sensor comprising an array of photocells. The light sensor of the illustrative embodiment measures ambient light reflected from a surface in area to be monitored. A lens directs the light onto the array of photocells, which are arranged regularly. In some embodiments of the present invention, the photocell array is a two-dimensional matrix. A microcontroller reads each individual photocell and processes the signals from the photocells according to one or more of the methods disclosed herein.

The light sensor is configurable in that the area that monitored by the light sensor is customized to match the area lit by an associated light source, according to one or more of the methods disclosed herein. The configuring process defines an active area to be monitored, by determining which subset of photocells in the array, referred to as the active set of photocells, corresponds to the area being illuminated by the light fixture. By being configurable in this way, the light sensor of the illustrative embodiment advantageously minimizes or eliminates the need to reposition sensors or to install additional sensors or light fixtures.

The light sensor is subsequently able to monitor the defined active area and to report sensor output values based on measurements made from the photocells monitoring the active area. In some embodiments of the present invention, the disclosed light sensor filters out the photocells, within the active set of photocells, whose reported light levels change incidentally. These changes in light level can be caused by people passing through the monitored area, by small items being left on a surface in the area, or by neighboring light sources whose light output changes over time. This filtering is in contrast to what is performed by at least some ambient light sensors in the prior art, which is typically a reporting of an average illuminance of the area being monitored. Advantageously, the disclosed light sensor is able to work in operating environments in which the particular set of photocells whose reported levels are to contribute to a sensor output value—that is, are not to be filtered out—can change from one moment in time to the next.

A first illustrative sensor node comprises: a photocell array comprising a plurality of photocells configured to sense light levels and to provide a plurality of illuminance signals that represent the light levels; a controller configured to: (i) provide a control signal to a light source via a first signal path, wherein the control signal is effective to control the light level emitted by the light source; (ii) measure light levels sensed by the photocells in the photocell array when the light source is off at a first time, resulting in a plurality of first measurements, wherein the controller makes the first measurements from illuminance signals received via a second signal path and that represent the light levels sensed by the photocells at the first time, (iii) measure light levels sensed by the photocells when the light source is on at a second time, resulting in a plurality of second measurements, wherein the controller makes the second measurements from illuminance signals received via the second signal path and that represent the light levels sensed by the photocells at the second time, (iv) measure light levels sensed by a nonempty first subset of the photocells at a third time, resulting in a plurality of third measurements, wherein the controller makes the third measurements from illuminance signals received via the second signal path and that represent the light levels sensed by the photocells at the third time, wherein the first time, second time, and third time are different from one another, wherein the first subset is a proper subset of the photocells in the photocell array, and wherein the first subset of photocells comprises at least one photocell whose second measurement is greater than the corresponding first measurement, and (v) calculate a first value from at least one measurement in the plurality of third measurements; and a communication interface configured to transmit an output signal that represents the first value.

A first illustrative method comprises: measuring, at a first node, light levels sensed by the photocells in a photocell array when a light source is off at a first time, resulting in a plurality of first measurements, wherein the first measurements are made from illuminance signals that represent the light levels sensed by the photocells at the first time; generating a first signal level to turn on the light source; measuring, at the first node, light levels sensed by the photocells when the light source is on at a second time, resulting in a plurality of second measurements, wherein the second measurements are made from illuminance signals that represent the light levels sensed by the photocells at the second time; measuring, at the first node, light levels sensed by a nonempty first subset of the photocells at a third time, resulting in a plurality of third measurements, wherein the third measurements are made from illuminance signals that represent the light levels sensed by the photocells at the third time, wherein the first time, second time, and third time are different from one another, wherein the first subset is a proper subset of the photocells in the photocell array, and wherein the first subset of photocells comprises at least one photocell whose second measurement is greater than the corresponding first measurement; calculating a first value that is determined from at least one measurement in the plurality of third measurements; and transmitting an output signal that represents the first value.

A second illustrative sensor node comprises: a photocell array comprising a plurality of photocells configured to sense light levels and to provide the plurality of illuminance signals that represent the light levels; a controller configured to: (i) provide a control signal to a light source via a first signal path, wherein the control signal is effective to control the light level emitted by the light source, (ii) measure light levels sensed by a nonempty first subset of the photocells in the photocell array at a third time, resulting in a plurality of measurements, wherein the measurements are made from illuminance signals received via a second signal path and that represent the light levels sensed by the photocells at the third time, wherein the first subset of photocells determined is based on light levels sensed by the photocells in the photocell array at a first time and at a second time, wherein the first, second, and third times are different from one another, and wherein the light source is on during at least one of the first, second, and third time; (iii) calculate the first value, wherein the first value is determined from a nonempty proper subset of the measurements, in the plurality of measurements, wherein the proper subset of the measurements is determined based on closeness in value of the measurements to one another; and a communication interface configured to transmit an output signal that represents the first value.

A second illustrative method comprises: measuring, at a first node, light levels sensed by a nonempty first subset of the photocells in a photocell array at a third time, resulting in a plurality of measurements, wherein the measurements are made from illuminance signals that represent the light levels sensed by the photocells at the third time, wherein the first subset of photocells is determined based on light levels sensed by the photocells in the photocell array at a first time and at a second time, wherein the first, second, and third times are different from one another, and wherein the light source is on during at least one of the first, second, and third time; calculating a first value, wherein the first value is determined from a nonempty proper subset of the measurements, in the plurality of measurements, wherein the proper subset of the measurements is determined based on closeness in value of the measurements to one another; and transmitting an output signal that represents the first value.

DETAILED DESCRIPTION

Figure 1:
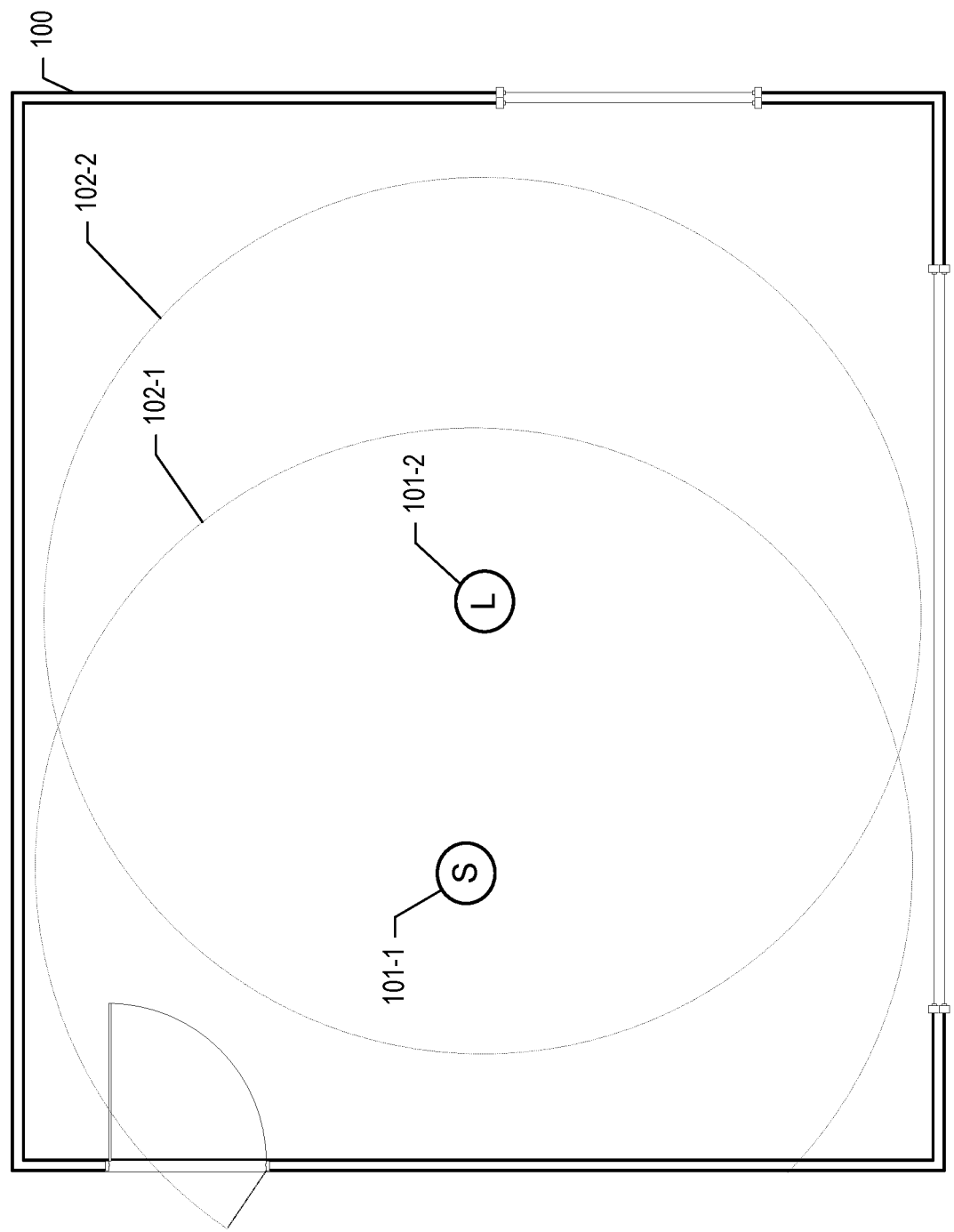
FIG. 1 in the prior art depicts sensor node 101-1 and luminaire node 101-2.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Control—For the purposes of this specification, the infinitive "to control" and its inflected forms (e.g., "controlling", "controlled", etc.) should be given the ordinary and customary meaning that the terms would have to a person of ordinary skill in the art at the time of the invention.

Controller—For the purposes of this specification, the term "controller" is defined as hardware or hardware and software that perform mathematical and/or logical operations and that control other devices based, at least in part, on the operations performed.

Generate—For the purposes of this specification, the infinitive "to generate" and its inflected forms (e.g., "generating", "generated", etc.) should be given the ordinary and customary meaning that the terms would have to a person of ordinary skill in the art at the time of the invention.

Lamp—For the purposes of this specification, the term "lamp" is defined as a device for providing illumination, comprising an electric bulb and its holder.

Luminaire—For the purposes of this specification, the term "luminaire, or "luminaire node," is defined as a lighting unit comprising a lamp and a controller for controlling the lamp.

Light source—For the purposes of this specification, the term "light source" is defined as being either a luminaire, which comprises a lamp, or the lamp itself, which can be part of either a luminaire node or a different type of connected node (e.g., a sensor node, etc.).

Measure—For the purposes of this specification, the infinitive "to measure" and its inflected forms (e.g., "measuring", "measured", etc.) should be given the ordinary and customary meaning that the terms would have to a person of ordinary skill in the art at the time of the invention.

Photocell—For the purposes of this specification, the term "photocell," or "photoelectric cell," is defined as a device that generates an electric current or voltage dependent on the degree of illumination.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Sensor node—For the purposes of this specification, the term "sensor node" is defined as a unit comprising one or more sensors for detecting one or more physical conditions and a controller for responding to information received from the one or more sensors.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

To facilitate explanation and understanding of the present invention, the following description sets forth several details. However, it will be clear to those having ordinary skill in the art, after reading the present disclosure, that the present invention may be practiced without these specific details, or with an equivalent solution or configuration. Furthermore, some structures, devices, and operations that are well known in the art are depicted in block diagram form in the accompanying figures in order to keep salient aspects of the present invention from being unnecessarily obscured.

Figure 2:
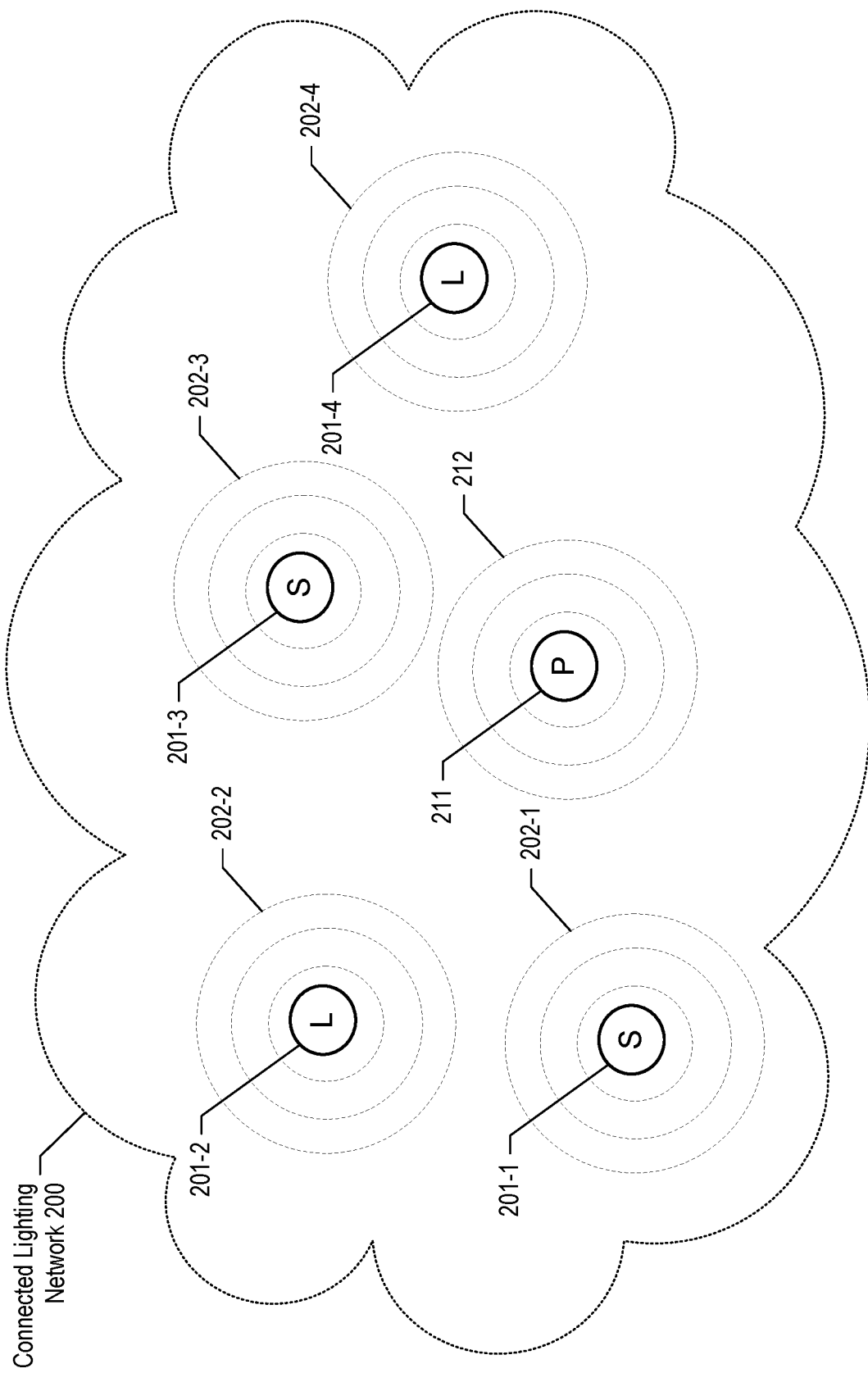
FIG. 2 depicts connected lighting network 200, in accordance with the illustrative embodiment.

FIG. 2 depicts connected lighting network 200, in accordance with the illustrative embodiment. Network 200 comprises smart nodes 201-1 through 201-M, wherein M is a positive integer (e.g., M equal to 4 as depicted, etc.), and wireless device 211. As depicted in FIG. 2, nodes 201-1 and 201-3 are light sensors (denoted by "S") and nodes 201-2 and 201-4 are light fixtures, or "luminaires," (denoted by "L"). In some embodiments of the present invention, the light sensors are specifically ambient light sensors. The networked nodes communicate wirelessly with one another via transmitted signals 202-1, 202-2, 202-3, 202-4, and 212.

In some alternative embodiments of the present invention, however, one or more of the depicted elements can communicate via wired connections. The depicted nodes are shown according to how they are situated in relation to one another. The group of nodes can be situated within a building or other structure.

Network 200 is a mesh data network that enables communication between wireless device 211 and smart nodes 201-1 through 201-M. To this end, the nodes within network 200 distribute data (e.g., the packet-based messages, etc.) in accordance with Bluetooth mesh networking. A "mesh network" is a network topology in which each node relays data for the network. The nodes that are involved cooperate in the distribution of data in the network. A mesh network can relay messages using either a flooding technique or a routing technique.

In some other embodiments, network 200 communicates via one or more other radio telecommunications protocols other than or in addition to Bluetooth mesh networking such as, but not limited to, Z-Wave, ZigBee, Thread, Wi-Fi, straight Bluetooth Low Energy (BLE), classic Bluetooth, and so on. Furthermore, as those who are skilled in the art will appreciate after reading this specification, wireless device 211 and at least some smart nodes 201-1 through 201-M in some embodiments can be connected directly and non-wirelessly to one other, at least for some purposes and/or for some portion of time, such as through Universal Serial Bus (USB), FireWire™, or Thunderbolt™, for example and without limitation.

In accordance with the illustrative embodiment, nodes 201-1 through 201-M constitute an automation and control system in a commercial building, such as an office space or a retail space. As those who are skilled in the art will appreciate after reading this specification, however, the system disclosed herein can also be applied to a different type of building, such as a home, or to include the environment surrounding the building, or to any environment in which automated control can be applied.

Furthermore, the building in which the nodes are situated can be any type of structure with a roof and walls, or can instead be a defined area that comprises multiple sub-areas (e.g., open space, one or more conference rooms, one or more corridors, one or more closed offices, etc.). At least a portion of the area and/or sub-areas can be defined by something other than a roof and/or walls (e.g., a tent, an outdoor pavilion, a covered parking lot, a stadium or arena, etc.).

In accordance with the illustrative embodiment, nodes 201-1 through 201-M constitute a connected lighting system. As those who are skilled in the art will appreciate after reading this specification, however, the system disclosed herein can also be applied to control a different type of domain than lighting. In other words, any reference herein to lighting system, light level, a light source, illuminance, a light sensor (e.g., photocell array, photocell, etc.), and any other lighting-related term, can be replaced with the corresponding term or terms related to a domain different than lighting.

For example and without limitation, a light sensor node and a luminaire node can be replaced respectively with a temperature sensor node and a heating and/or cooling unit in the climate control domain. In the foregoing example, terms corresponding to the list in the preceding paragraph can be temperature, a heating/cooling source, heat, a heat sensor (e.g., infrared sensor, etc.), respectively, although other equivalent terms can be used instead. As another non-limiting example, a light sensor node and a luminaire node can be replaced respectively with a sound/vibration sensor node and a loudspeaker in the sound or audio domain. In the foregoing example, terms corresponding to the list in the preceding paragraph can be sound level, a sound source (e.g., loudspeaker, etc.), sound, a sound sensor (e.g., microphone, etc.), respectively, although other equivalent terms can be used instead.

As those who are skilled in the art will appreciate after reading this specification, the luminaire nodes, as well as the nodes in general, can be positioned in any geometry or geometries with respect to one another, provided that each node is within communication range of one or more of the other nodes.

Wireless device 211 is a wireless telecommunications terminal that is configured to transmit and/or receive communications wirelessly. It is an apparatus that comprises memory, processing components, telecommunication components, and user interface components (e.g., display, speaker, keyboard, microphone, etc.). Wireless device 211 comprises the hardware and software necessary to be compliant with the protocol standards used in the wireless networks in which it operates and to perform the processes described below and in the accompanying figures. For example and without limitation, wireless device 211 is capable of:
  i. handling an incoming or outgoing telephone call or other communication (e.g., application-specific data, SMS text, email, media stream, etc.),
  ii. provisioning one more devices into mesh network nodes 201-1 through 201-M, and
  iv. Configuring one or more of network nodes 201-1 through 201-M.
Wireless device 211 is described in detail below and in FIG. 3.

Wireless device 211 is illustratively a smartphone with at least packet data capability provided and supported by the network in which it operates, namely network 200, and that is configured to execute a software application (e.g., an "app") for configuring one or more of the smart devices (e.g., lights, sensors, etc.) in network 200. In particular, the application enables the configuring of one or more of the sensor nodes (e.g., by an installing technician, etc.).

In some embodiments of the present invention, device 211 is a different type of data-processing system, or executes an application that is different than a device-based app, or both. For example and without limitation, wireless device 211 can be referred to by a variety of alternative names such as, while not being limited to, a mobile station, a wireless transmit/receive unit (WTRU), a user equipment (UE), a wireless terminal, a cell phone, or a fixed or mobile subscriber unit. Wireless device 211 can be any other type of device (e.g., a tablet, etc.) that is capable of operating in a wireless network environment, mobility-oriented or otherwise. In some alternative embodiments of the present invention, device 211 is instead a data-processing system at a factory or other place removed from the installation site, in which the light source angle and/or illumination cone is already known and the sensor node can be configured to match it while under the direction of device 211.

In some embodiments of the present invention, device 211 comprises, or is itself, an Ethernet-to-Bluetooth gateway. In such embodiments, device 211 is wireless in the sense that it has and it uses a Bluetooth radio on one end of its gateway function, while the other end of the gateway function can interface to Ethernet cable (i.e., a wired interface).

Each node 201-m, wherein m has a value between 1 and M, inclusive, is an apparatus that comprises memory, processing components, and communication components. Node 201-m is configured to transmit signals 202-m that convey control-related information, such as packet-based messages. Luminaire 201-m, for m=1 and 4, is also configured to provide light at an output that is based, at least in part, on the content of one or more messages received from one or more other nodes. Sensor node 201-m, for m=2 and 3, is also configured to sense one or more physical conditions, such as light, and can transmit messages based on the one or more physical conditions sensed. Node 201-1, a sensor node, is described in detail below and in FIG. 4.

Figure 3:
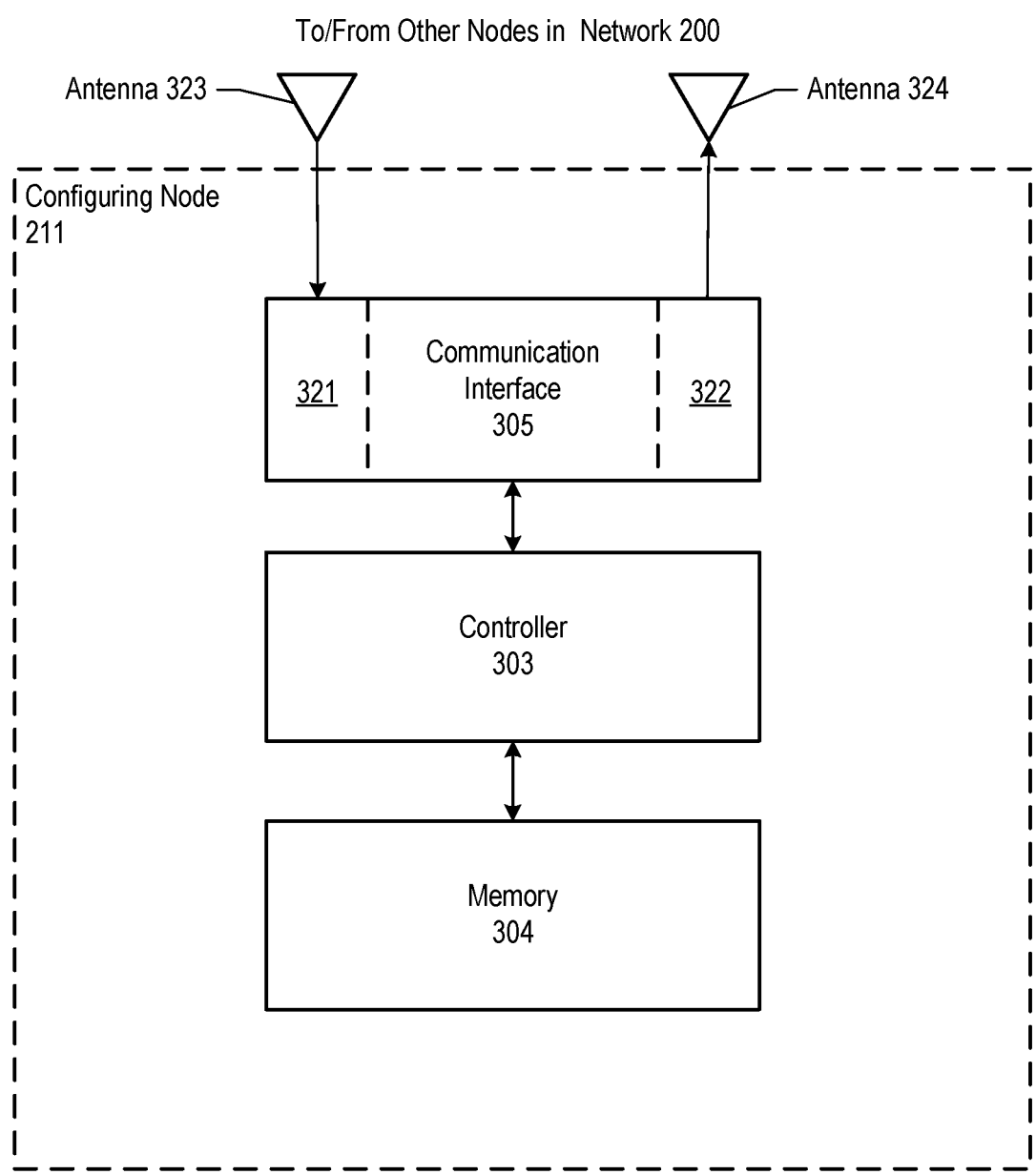
FIG. 3 depicts the salient components of wireless device 211 according to the illustrative embodiment.

FIG. 3 depicts the salient components of wireless device 211 according to the illustrative embodiment. Wireless device 211 is also referred to as the "configuring node." Wireless device 211 is based on a data-processing apparatus whose hardware platform comprises: controller 303, memory 304, and communication interface 305, interconnected as shown.

Controller 303 is a processing device, such as a microcontroller or microprocessor with a controller interface, which are well known in the art. Controller 303 is configured such that, when operating in conjunction with the other components of wireless device 211, controller 303 executes software, processes data, and telecommunicates according to the operations described herein.

Memory 304 is non-transitory and non-volatile computer storage memory technology that is well known in the art (e.g., flash memory, etc.). Memory 304 is configured to store an operating system, application software, and a database. The operating system is a collection of software that manages, in well-known fashion, wireless device 211's hardware resources and provides common services for computer programs, such as those that constitute the application software. The application software that is executed by controller 303 according to the illustrative embodiment enables wireless device 211 to perform the functions disclosed herein.

It will be clear to those having ordinary skill in the art how to make and use alternative embodiments that comprise more than one memory 304; or comprise subdivided segments of memory 304; or comprise a plurality of memory technologies that collectively store the operating system, application software, and database.

Communication interface 305 is configured to enable wireless device 211 to telecommunicate with other devices, by receiving signals therefrom and/or transmitting signals thereto via receiver 321 and transmitter 322, respectively. In order to communicate with devices outside of mesh network 200, communication interface 305 communicates in accordance with WiFi or other applicable standard. In order to communicate with other devices within mesh network 200, module 305 communicates in accordance with Bluetooth mesh networking. In some other embodiments, communication interface 305 communicates via one or more other radio telecommunications protocols other than or in addition to WiFi and Bluetooth mesh networking, such as, but not limited to, a cellular network standard (e.g., LTE, GSM, etc.), Z-Wave, ZigBee, Thread, Wi-Fi, straight Bluetooth Low Energy (BLE), classic Bluetooth, and so on.

Receiver 321 is a component that enables wireless device 211 to telecommunicate with other components and systems by receiving signals that convey information therefrom and through antenna 323. It will be clear to those having ordinary skill in the art how to make and use alternative embodiments that comprise more than one receiver 321.

Transmitter 322 is a component that enables wireless device 211 to telecommunicate with other components and systems by transmitting signals that convey information thereto and through antenna 324. It will be clear to those having ordinary skill in the art how to make and use alternative embodiments that comprise more than one transmitter 322.

In accordance with the illustrative embodiment, wireless device 211 uses communication interface 305 in order to telecommunicate wirelessly with external devices. It will be clear to those skilled in the art, however, after reading the present disclosure, how to make use and use various embodiments of the present invention in which wireless device 211 communicates via a wired protocol (e.g., X10, KNX, etc.) over physical media (e.g., cable, wire, etc.) with one or more external devices, either in addition to or instead of the wireless capability provided by communication interface 305.

In some embodiments of the present invention, wireless device 211 is responsible for initiating the configuration process, by transmitting a command to one or more sensor nodes, including sensor node 201-1, wherein the command is for configuring the sensor node. The sensor node receives and acts upon the command as described below and in regard to FIG. 7.

Figure 4:
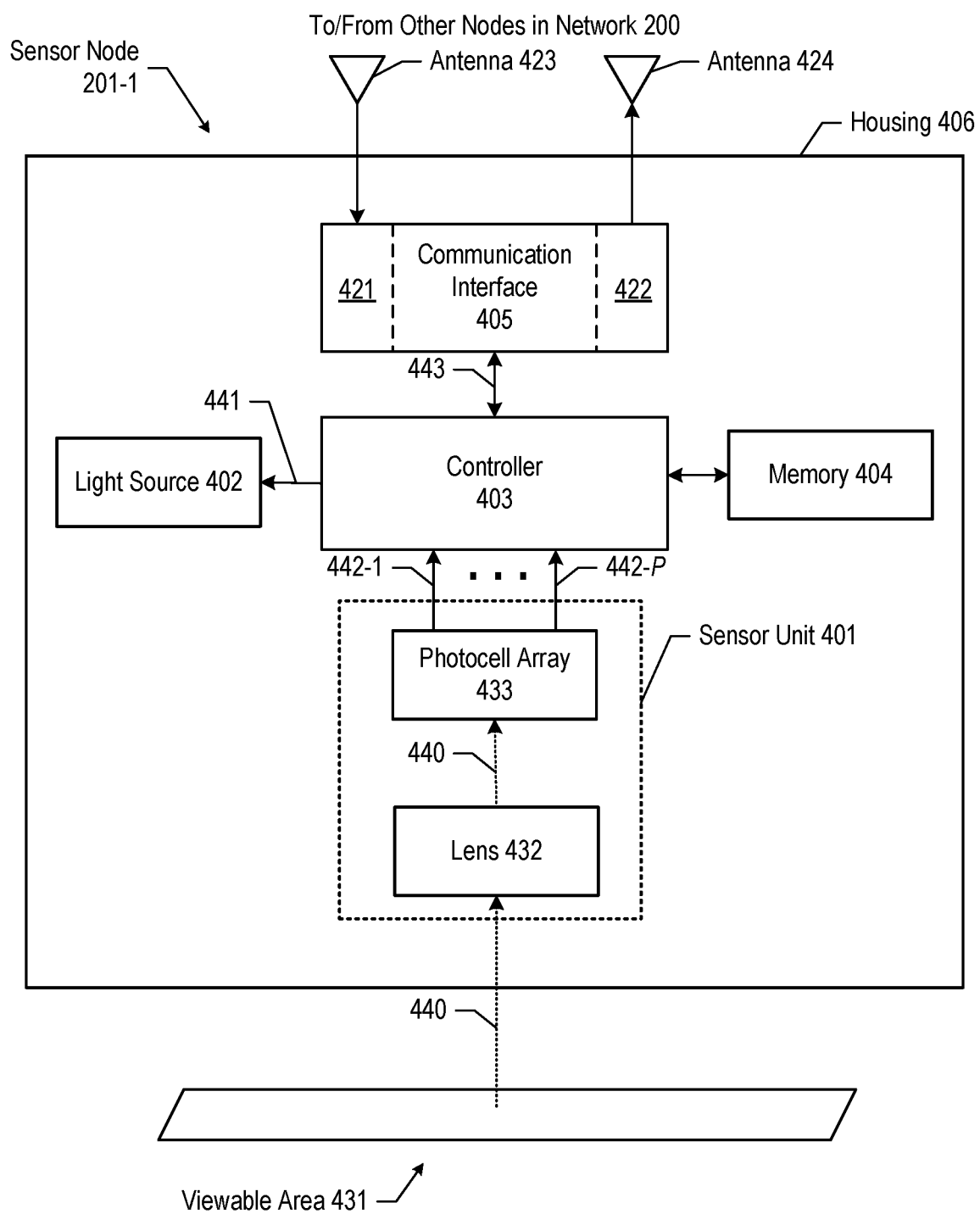
FIG. 4 depicts the salient components of sensor node 201-1 according to the illustrative embodiment.

FIG. 4 depicts the salient components of sensor node 201-1 according to the illustrative embodiment. Sensor node 201-1 comprises: sensor unit 401, light source 402, controller 403, memory 404, communication interface 405, and housing 406, interrelated as shown.

Sensor unit 401 is an apparatus that comprises memory, processing components, and communication components, and is configured to gather information about the environment that is accessible by the sensor unit. Sensor unit 401 is configured to monitor a particular physical condition in well-known fashion—in this case, light reflected off of viewable area 431. To this end, sensor unit 401 comprises lens 432 and photocell array 433. Lens 432 directs light rays 440 from viewable area 431 onto photocell array 433, which comprises P photocells, wherein P is a positive integer that is greater than one. The P photocells of array 433 provide illuminance signals, in the form of electrical signals, to controller 403 along respective signal paths 442-1 through 442-P, wherein the values or levels of the illuminance signals are representative of the light levels sensed by the photocells. Lens 432 and photocell array 433 are described below and in regard to FIG. 5.

Light source 402 is an apparatus that comprises, memory, processing components, and communication components, and is capable of doing something in the course of being affected by signals originating externally to the component, such as from controller 403 via signal path 441 (e.g., an electrical connection, a wireless connection, etc.), as described in detail below. In accordance with the illustrative embodiment, light source 402 comprises a lamp that can be turned on or off by controller logic executed by controller 403. In some embodiments of the present invention, light source 402 is further capable of being controlled by controller 403 with regard to changing its light output, brightness, lighting color or mood, or illuminance, or with regard to displaying a picture or pattern.

In some embodiments of the present invention, sensor node 201-1 does not comprise a light source. In such embodiments, light source 402 can be a node within network 200 that is physically distinct from sensor node 201-1, such as luminaire 201-1 or 201-4, in which sensor node 201-1 provides control signals (e.g., turn on, turn off, etc.) and information to the separate luminaires through network 200.

Controller 403 is a processing device, such as a microcontroller or microprocessor with a controller interface, which are well known in the art. For example and without limitation, the microcontroller can be part of an nRF52832 integrated circuit (IC) by Nordic Semiconductor, which is integrated with Bluetooth, or can be a SAM3X IC by Atmel Corporation. Controller 403 is configured such that, when operating in conjunction with the other components of node 201-1, controller 403 executes software, processes data, and telecommunicates according to the operations described herein, including those depicted in FIGS. 7 through 9. In some alternative embodiments of the present invention, i) controller 403 and ii) one or both of sensor unit 401 and light source 402 are separate nodes within data network 200 that communicate with each other via the communication protocol (e.g., Bluetooth Mesh, etc.) of network 200.

Memory 404 is non-transitory and non-volatile computer storage memory technology that is well known in the art (e.g., flash memory, etc.). Memory 404 is configured to store an operating system, application software, and a database. The operating system is a collection of software that manages, in well-known fashion, node 201-1's hardware resources and provides common services for computer programs, such as those that constitute the application software. The application software that is executed by controller 403 according to the illustrative embodiment enables node 201-1 to perform the functions disclosed herein. The database stores information defining the active area of photocell array 433, once determined.

It will be clear to those having ordinary skill in the art how to make and use alternative embodiments that comprise more than one memory 404; or comprise subdivided segments of memory 404; or comprise a plurality of memory technologies that collectively store the operating system, application software, and database.

Communication interface 405 is configured to enable node 201-1 to telecommunicate with other devices and systems, including other mesh network nodes, by receiving signals therefrom and/or transmitting signals thereto via receiver 421 and transmitter 422, respectively, an exchanging the signals with controller 403 via signal path 443 (e.g., an electrical connection, a wireless connection, etc.). Communication interface 405 communicates in accordance with Bluetooth mesh networking. In some other embodiments, communication interface 405 communicates via one or more other radio telecommunications protocols other than or in addition to Bluetooth mesh networking such as, but not limited to, Z-Wave, ZigBee, Thread, Wi-Fi, straight Bluetooth Low Energy (BLE), classic Bluetooth, and so on.

Receiver 421 is a component that enables node 201-1 to telecommunicate with other components and systems by receiving signals that convey information therefrom and through antenna 423. It will be clear to those having ordinary skill in the art how to make and use alternative embodiments that comprise more than one receiver 421.

Transmitter 422 is a component that enables node 201-1 to telecommunicate with other components and systems by transmitting signals that convey information thereto and through antenna 424. It will be clear to those having ordinary skill in the art how to make and use alternative embodiments that comprise more than one transmitter 422.

In accordance with the illustrative embodiment, node 201-1 uses communication interface 405 in order to telecommunicate wirelessly with external devices. It will be clear to those skilled in the art, however, after reading the present disclosure, how to make use and use various embodiments of the present invention in which node 201-1 communicates via a wired protocol (e.g., X10, KNX, etc.) over physical media (e.g., cable, wire, etc.) with one or more external devices, either in addition to or instead of the wireless capability provided by communication interface 405. In some embodiments of the present invention, communication interface 405 is implemented on hardware that is physically distinct from that of controller 403, while in some other embodiments communication interface 405 is implemented on the same hardware (IC) as controller 403.

Housing 406 contains sensor unit 401, light source 402, controller 403, memory 404, and communication interface 405. It will be clear to those having ordinary skill in the art how to make and use housing 406.

Figure 5:
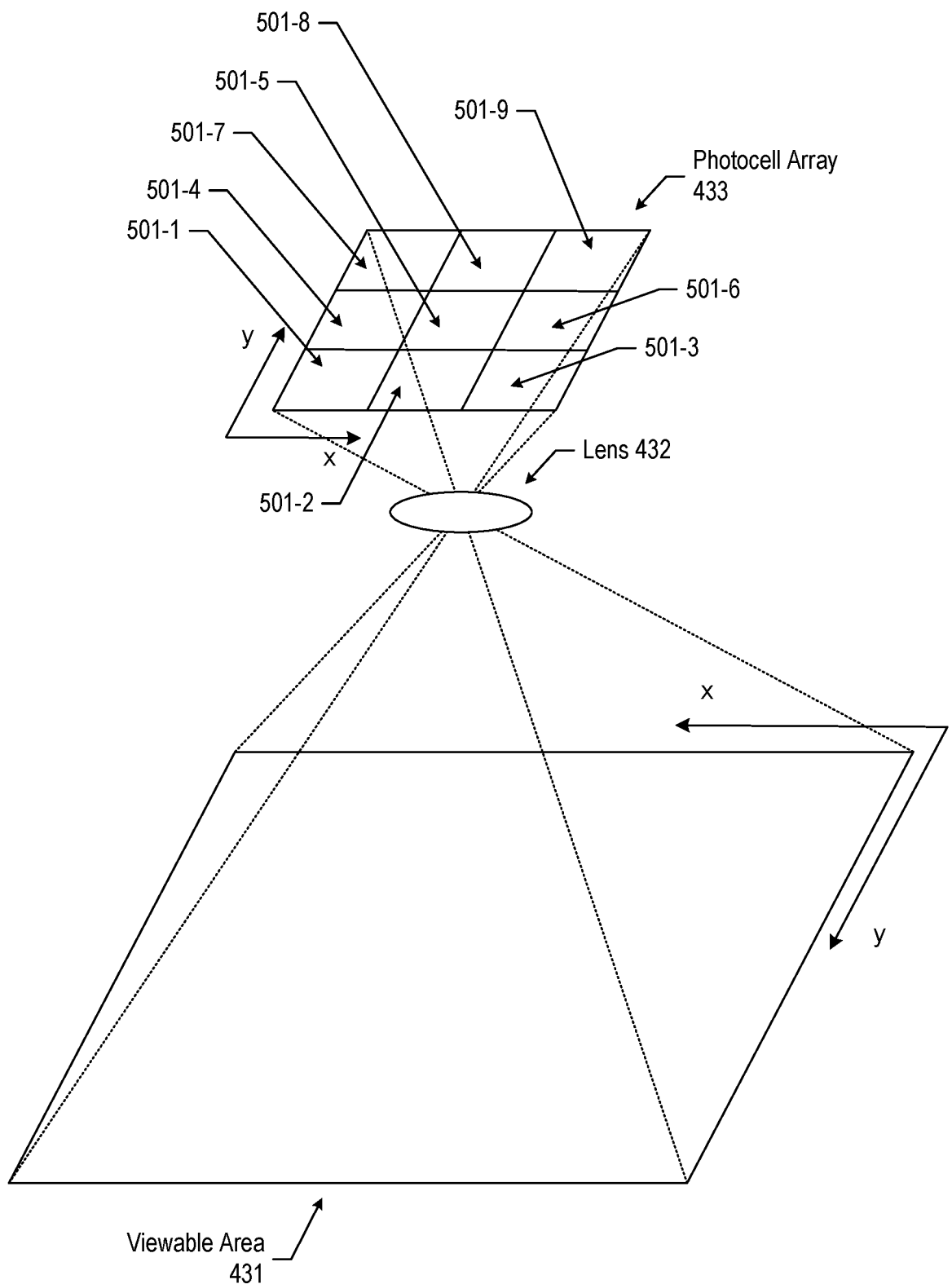
FIG. 5 depicts lens 432 and photocell array 433, which are included in sensor unit 401.

FIG. 5 depicts lens 432 and photocell array 433, which are included in sensor unit 401. Lens 432 directs light from viewable area 431 onto photocell array 433. The optical system comprising lens 432 has a viewing area that is wider than the area lighted by light source 402, as described below and in FIG. 6. In some alternative embodiments of the present invention, the optical system utilizes something other than, or in addition to, lens 432 to direct the reflected light onto the photocell, such as an aperture or a focusing mirror.

Photocell array 433 is depicted as a two-dimensional matrix having photocells 501-1 through 501-P, wherein P has a value equal to 9 as depicted and wherein the photocells are situated in three rows and three columns in the matrix. The photocells in array 433 are collectively referred to in this specification as "photocells 501." As those who are skilled in the art will appreciate after reading this specification, P can have a value different than 9 in some alternative embodiments of the present invention. Furthermore, the dimensioning of the matrix (i.e., number of rows and columns) can be different than depicted. In some alternative embodiments, photocell array 433 can instead be a one-dimensional array of photocells. The P photocells of photocell array 433 provide illuminance signals to controller 403 as depicted in FIG. 4.

The photocells of array 433 can be implemented with phototransistors, photoresistors, or an integrated chip, for example and without limitation. The photocell array can come as a prefabricated component, such as the OV9281 or OV9282 image sensors by OmniVision Technologies Inc., or can be created from discrete components as the TEMT6200FX01 phototransistor by Vishay Technology, Inc. or the LV0104CS photo IC by ON Semiconductor.

Viewable area 431 as depicted is the total area of one or more surfaces from which light (e.g., reflected light, etc.) is being directed by lens 432 to within the boundaries of photocell array 433. At least some of the x-y coordinate points within viewable area 431 map to corresponding x-y points within photocell array 433.

Figure 6:
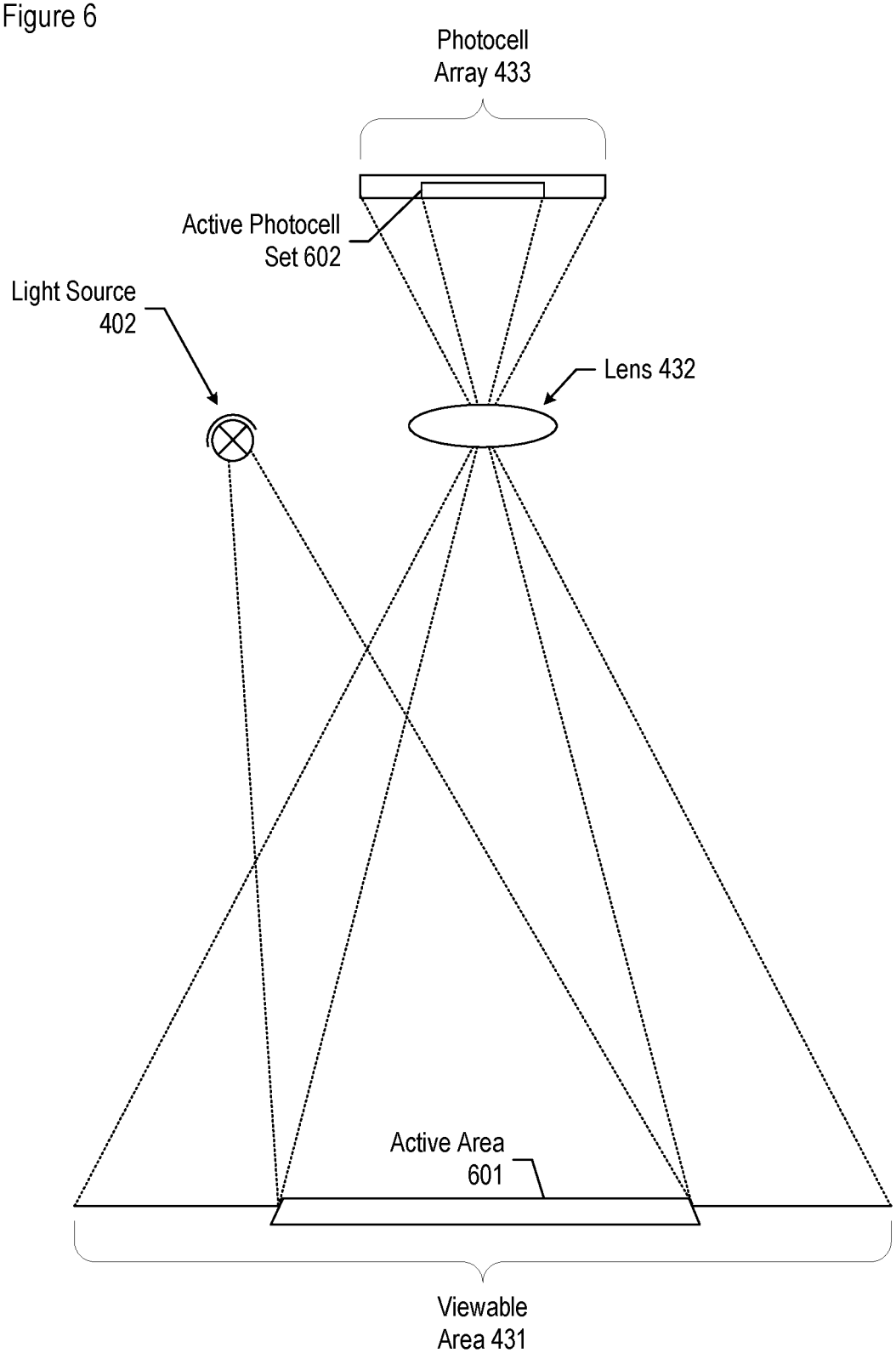
FIG. 6 depicts light source 402, lens 432, and photocell array 433.

FIG. 6 depicts light source 402, lens 432, and photocell array 433. As depicted, light source 402 provides light to an illuminated area, which coincides with active area 601, whose area is smaller than that of viewable area 431. Rays of light from active area 601 are directed through lens 432 and impinge on a subset of the photocells of photocell array 433. In accordance with the illustrative embodiment, the area to be monitored by sensor 201-1 matches closely the area lighted by light source 402 (i.e., coinciding with active area 601). In such an embodiment, active photocell set 602 is the subset of photocells that corresponds to active area 601 as described above. Sensor 201-1 defines active photocell set 602 by using selected photocells to match the shape and/or size of the light from the illuminated area.

As those who are skilled in the art will appreciate after reading this specification, in some embodiments of the present invention the area to be monitored does not necessarily match the illuminated area. For example, there might be scenarios in which sensor 201-1 is called upon to monitor an active area 601 that is wider or different than that of the illuminated area, or in which sensor 201-1 is not matched one-for-one with a luminaire (e.g., one sensor node in a zone that is lighted by three luminaires, etc.).

Figure 7:
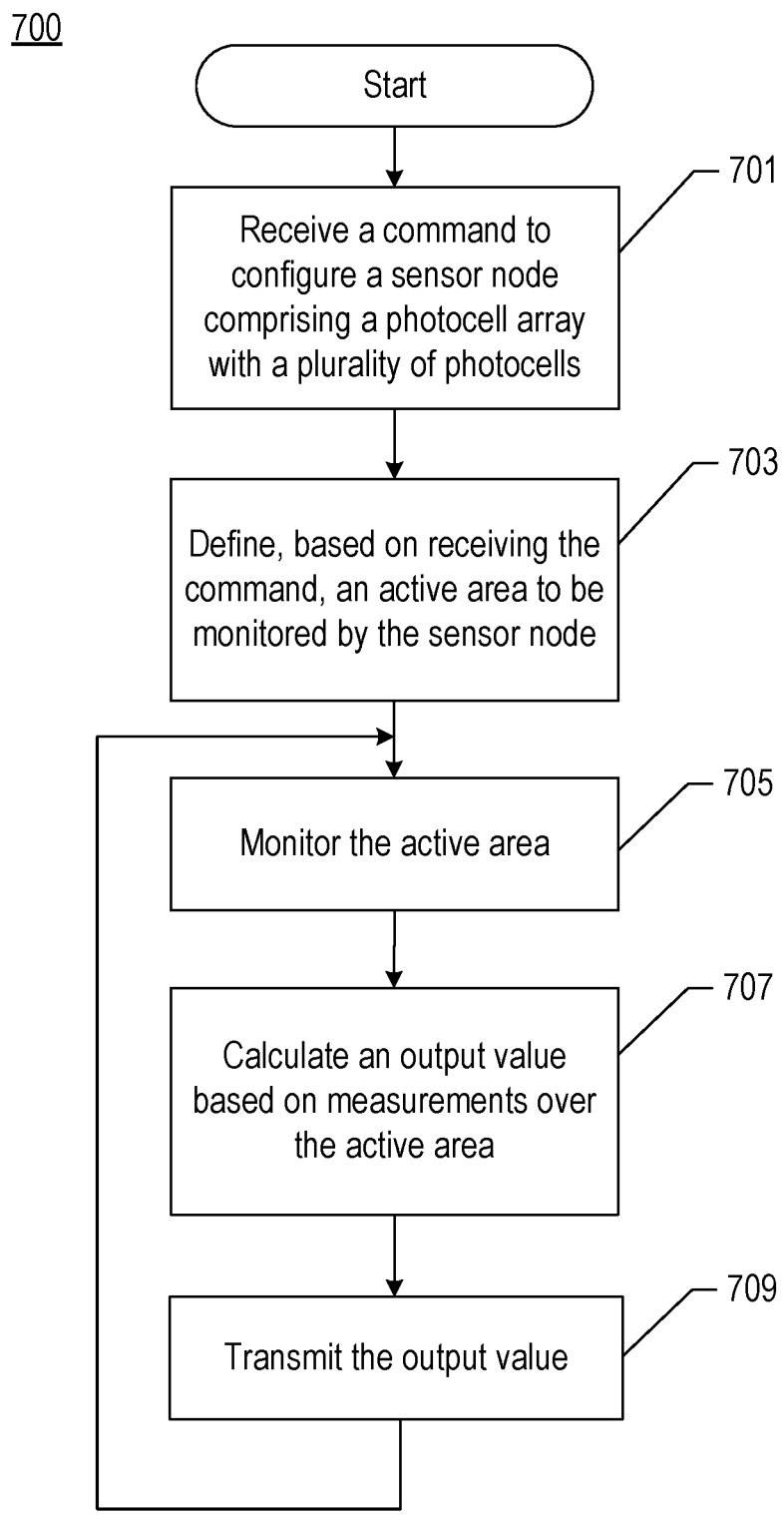
FIG. 7 depicts salient operations of method 700 according to the illustrative embodiment, by which sensor node 201-1 configures itself and subsequently, during monitoring-related operations, reports information based on its configuration.

Operations of Sensor Node in Configuring and Reporting:

FIG. 7 depicts salient operations of method 700 according to the illustrative embodiment, by which sensor node 201-1 performs various functions that are related to configuring itself and subsequently, during monitoring-related operations, to reporting information based on its configuration.

In regard to method 700, as well as to the other methods depicted in the flowcharts and message flow diagrams contained herein, it will be clear to those having ordinary skill in the art, after reading the present disclosure, how to make and use alternative embodiments of the disclosed methods in which the recited operations, sub-operations, and messages are differently sequenced, grouped, or sub-divided—all within the scope of the present invention. It will be further clear to those skilled in the art, after reading the present disclosure, how to make and use alternative embodiments of the disclosed methods wherein some of the described operations, sub-operations, and messages are optional, are omitted, or are performed by other elements and/or systems than the illustrative devices associated with the respective methods.

In accordance with operation 701, sensor 201-1 receives a command from wireless device 211 to configure itself.

In accordance with operation 703, and in response to receiving the command in operation 701, sensor node 201-1 configures itself by defining an active photocell set 602 that will be used by sensor node 201-1 to monitor an active area. Sensor node 201-1 defines the active set of photocells by i) measuring the background light level for each photocell while light source 402 is off, ii) measuring the background light level for each photocell while light source 402 is on, and iii) selecting the photocells for which the measured light level has changed between the two sets of measurements in accordance with criteria described below. Operation 703 is described in detail below and in regard to FIG. 8.

In accordance with operation 705, sensor node 201-1 monitors active area 601 by receiving illuminance signals from the photocells in active photocell set 602.

In accordance with operation 707, sensor node 201-1 calculates an output value based on measurements made from one or more of the illuminance signals from the photocells in active photocell set 602. In accordance with the illustrative embodiment, sensor node 201-1 calculates a value based only on the photocells in set 602. Operation 707 is described in detail below and in regard to FIG. 9.

In accordance with operation 709, communication interface 405 of sensor node 201-1 transmits the output value calculated in accordance with operation 707, to another node within data network 200. For example, sensor node 201 transmits the output value to a centralized controller or to luminaire node 201-1 itself so as to control the output level of a lamp that is associated with the luminaire node. In some embodiments of the present invention, sensor node 201-1 transmits information characterizing active photocell set 602 (e.g., indicia of the individual photocells, etc.); for example, such information can be transmitted to wireless device 211, as part of the configuration procedure, or to another node within data network 200.

Figure 8:
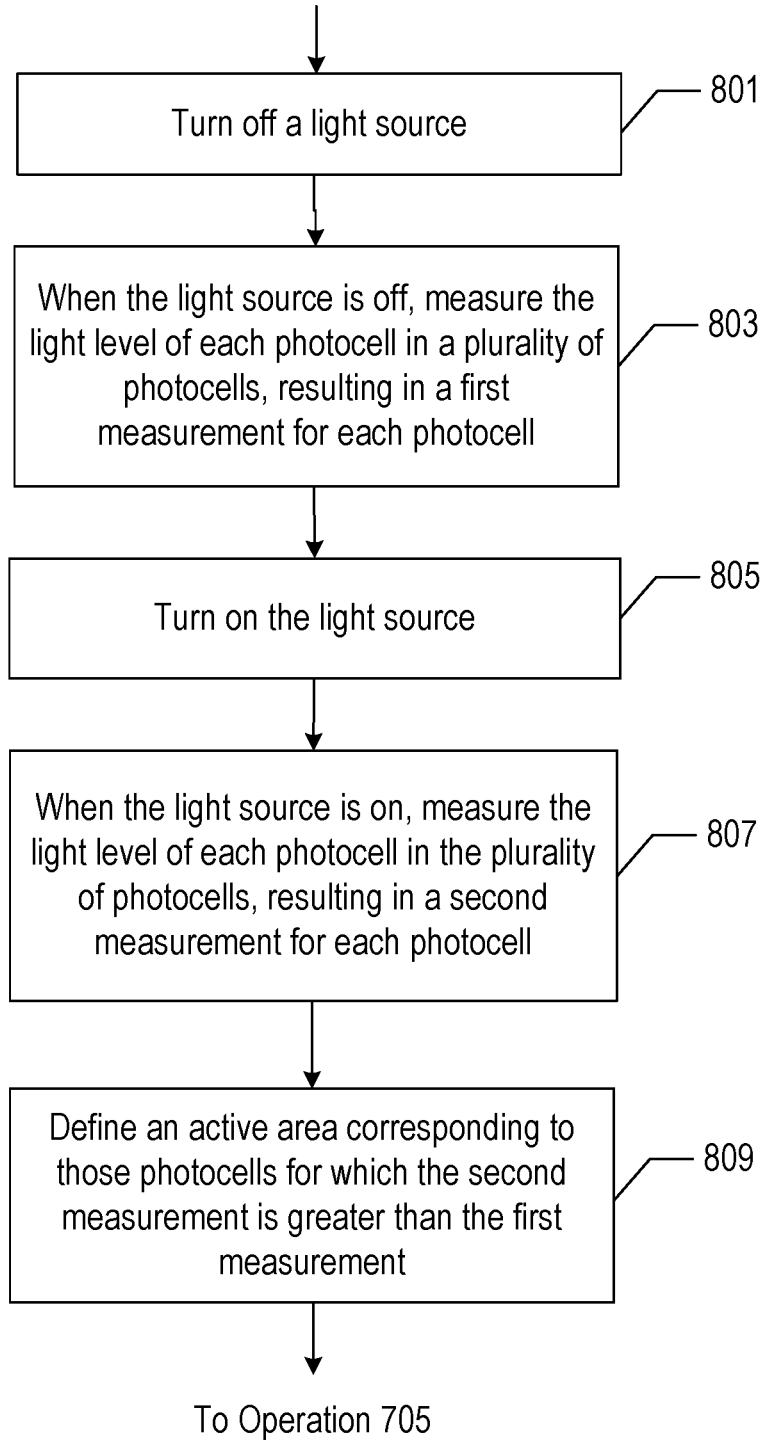
FIG. 8 depicts salient operations of method 703, by which sensor node 201-1 configures itself by defining active photocell set 602.

Operations in Defining an Active Area:

FIG. 8 depicts salient operations of method 703 according to the illustrative embodiment, by which sensor node 201-1 configures itself by defining active photocell set 602, thereby defining an active area to be monitored (i.e., area 601). As depicted, controller 403 first measures light levels when light source 402 is turned off, then measures light levels when the light source is turned on; as those who are skilled in the art will appreciate after reading this specification, however, the order in which controller 403 measures the light levels can be reversed (i.e., first turned on, then turned off) in some alternative embodiments. In other words, operations 801 and 803 can be performed after operations 805 and 807 in some alternative embodiments.

In accordance with operation 801, controller 403 of sensor node 201-1 transmits a control signal through signal path 441 to light source 402 to turn off (i.e., to stop emitting light).

In accordance with operation 803, controller 403 measures light levels sensed by photocells 501 in photocell array 433 when light source 402 is off at a first time, $t_1$, resulting in a plurality of first measurements. Controller 403 makes the first measurements from illuminance signals received via signal path 442 and that represent the light levels sensed by photocells 501 at time $t_1$, which can be a point in time or part of a finite interval of time.

In accordance with operation 805, controller 403 transmits a control signal through signal path 441 to light source 402 to turn on (i.e., to start emitting light).

In accordance with operation 807, controller 403 measures light levels sensed by photocells 501 in photocell array 433 when light source 402 is on at a second time, $t_2$, resulting in a plurality of second measurements. Controller 403 makes the second measurements from illuminance signals received via signal path 442 and that represent the light levels sensed by photocells 501 at time $t_2$, which can be a point in time or part of a finite interval of time. In accordance with the illustrative embodiment, times $t_1$ and $t_2$ are different from each other.

In accordance with operation 809, controller 403 defines active photocell set 602, which is a subset of photocells 501 in array 433. In accordance with the illustrative embodiment, set 602 is a proper subset of photocells 501 and comprises at least one photocell whose second measurement made in operation 807 is greater than its first measurement made in operation 803.

In some embodiments of the present invention, active photocell set 602 comprises all photocells whose second measurements are greater than their corresponding first measurements, and possibly has one or more additional photocells as well. In some other embodiments of the present invention, set 602 consists exactly of all photocells whose second measurements are greater than their corresponding first measurements. In still some other embodiments of the present invention, one or more of the second measurements are greater than the corresponding first measurements by a predefined amount.

After operation 809, control of task execution proceeds back to operation 705.

Figure 9:
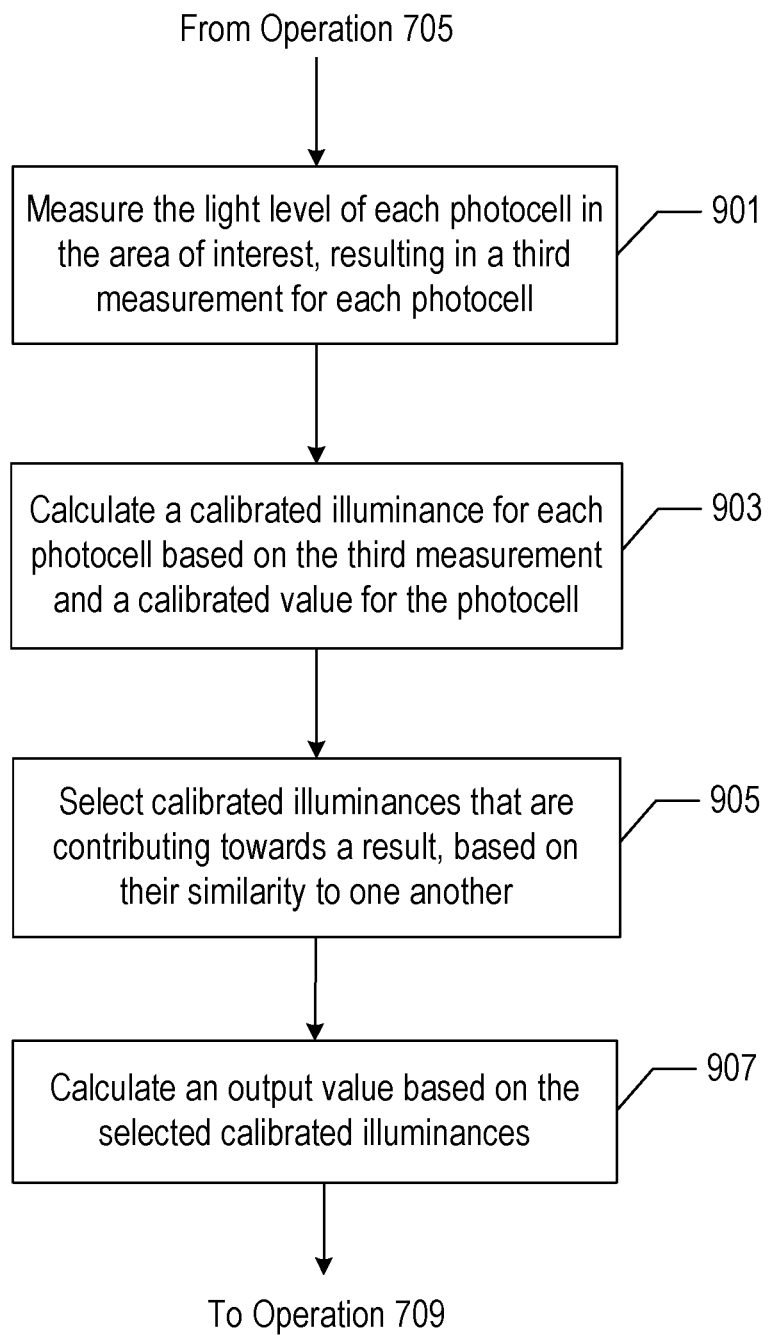
FIG. 9 depicts salient operations of method 707, by which sensor node 201-1 calculates one or more sensor node output values based on set 602.

Operations in Calculating an Output Value Based on the Active Area:

FIG. 9 depicts salient operations of method 707 according to the illustrative embodiment, by which sensor node 201-1 calculates one or more sensor node output values, based on monitoring the active area 601.

In accordance with operation 901, controller 403 measures light levels sensed by active photocell set 602 at a third time, $t_3$, resulting in a plurality of third measurements, wherein the controller makes the third measurements from illuminance signals received via signal path 442 and that represent the light levels sensed by the photocells in set 602 at time $t_3$, which can be a point in time or part of a finite interval of time. In accordance with the illustrative embodiment, time $t_3$ is different than times $t_1$ and $t_2$.

In accordance with operation 903, controller 403 calculates a logarithmic calibrated illuminance (LCI) for each photocell 501-$i$ that is in set 602, according to the equation:

$$LCI_i = \log(MI_i) + LCC_i, \quad \text{(Eq. 1)}$$

wherein:
  $MI_i$ is the illuminance light level (i.e., "third measurement") of photocell 501-$i$, and
  $LCC_i$ is a calibration value for photocell 501-$i$.
  $LCC_i$ can be calculated ahead of time by turning on all light sources, including light source 402, and measuring the actual illuminance value with a calibrated lux meter, resulting in a measurement, RI. Then, a calibration value can be calculated for each active photocell according to the equation:

$$LCC_i = \log(RI) - \log(CMI_i), \quad \text{(Eq. 2)}$$

wherein:
  $LCC_i$ is the logarithmic calibration correction,
  RI is the illuminance measured by the lux meter during the calibration procedure, and
  $CMI_i$ is the photocell illuminance reported by photocell 501-$i$ during the calibration procedure.

Controller 403 performs at least some of the processing in the log domain, in order to reduce errors. As those who are skilled in the art will appreciate after reading this specification, in some embodiments of the present invention the calculations can be performed linearly instead of logarithmically.

In accordance with operation 905, controller 403 filters out photocells whose illuminance signals are potentially being affected by incidental factors. Such factors include people passing through the area being monitored by sensor 201-1, small items being left on a surface within the monitored area, and neighboring light sources, for example and without limitation. For example, a person wearing dark clothes might enter the room; as the dark materials absorbs light, the photocells in sensor 201-1 might sense erroneously that the light level itself is lower. The calculation performed by controller 403 seeks to eliminate or at least mitigate the influence of local changes in illumination that are caused by such factors.

To this end, controller 403 selects a proper subset of photocells within active set 602 based on the similarity of their LCI values (i.e., calibrated measurements) to one another. Similarity can be based, for example, on the closeness in value of the LCI values to one another. In some embodiments of the present invention, the photocells are selected based on the degree to which LCI values of the third measurements in operation 901 of the light levels sensed by active photocell set 602 are within a predefined numeric range of one another. In some embodiments of the present invention, the predefined range can be defined as those values corresponding to the photocells within active set 602 having the N closest values to each other. The range, for example, can be defined as a ratio or percentage (e.g., 50%, etc.) of all the photocells in the active set (i.e., N out of A photocells, wherein A is the number of photocells in active set 602).

In accordance with operation 907, controller 403 calculates a scalar output value, LuxOut, according to the equation:

$$\mathit{Lux}\mathrm{Out} = \exp(AV), \quad \text{(Eq. 3)}$$

wherein AV is the arithmetic mean of the $LCI_i$ values of the subset of photocells selected in accordance with operation 905. In some alternative embodiments, one or more of the La values are combined based on a mathematical operation different than the arithmetic mean (e.g., weighted average, median, mode, etc.).

In some embodiments of the present invention, AV and/or an La value is transmitted to another node at operation 709, instead of or in addition to LuxOut.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A first node comprising:
   a photocell array comprising a plurality of photocells configured to sense light levels and to provide a plurality of illuminance signals that represent the light levels;
   a controller configured to:
   i) provide a control signal to a light source via a first signal path, wherein the control signal is effective to control the light level emitted by the light source;
   ii) measure light levels sensed by the photocells in the photocell array when the light source is off at a first time, resulting in a plurality of first measurements, wherein the controller makes the first measurements from illuminance signals received via a second signal path and that represent the light levels sensed by the photocells at the first time,
   iii) measure light levels sensed by the photocells when the light source is on at a second time, resulting in a plurality of second measurements, wherein the controller makes the second measurements from illuminance signals received via the second signal path and that represent the light levels sensed by the photocells at the second time,
   iv) measure light levels sensed by a nonempty first subset of the photocells at a third time, resulting in a plurality of third measurements, wherein the controller makes the third measurements from illuminance signals received via the second signal path and that represent the light levels sensed by the photocells at the third time, wherein the first time, second time, and third time are different from one another, wherein the first subset is a proper subset of the photocells in the photocell array, and wherein the first subset of photocells comprises at least one photocell whose second measurement is greater than the corresponding first measurement, and
   v) calculate a first value from at least one measurement in the plurality of third measurements; and
   a communication interface configured to transmit an output signal that represents the first value.

2. The first node of claim 1 further comprising an optical system configured to direct light from a viewable area onto the photocell array.

3. The first node of claim 1 wherein the photocell array is a matrix of photocells.

4. The first node of claim 1 wherein the first subset of photocells comprises all photocells whose second measurements are greater than the corresponding first measurements.

5. The first node of claim 1 wherein the first subset of photocells consists of all photocells whose second measurements are greater than the corresponding first measurements.

6. The first node of claim 1 wherein the first value is further determined based on the degree to which calibrated values of the third measurements of the light levels sensed by the first subset of the photocells are close in value to one another.

7. The first node of claim 1, further comprising the light source, wherein the light source is in communication with the controller via the first signal path.

8. A method comprising:
   measuring, at a first node, light levels sensed by photocells in a photocell array when a light source is off at a first time, resulting in a plurality of first measurements, wherein the first measurements are made from illuminance signals that represent the light levels sensed by the photocells at the first time;
   generating a first signal level to turn on the light source;
   measuring, at the first node, light levels sensed by the photocells when the light source is on at a second time, resulting in a plurality of second measurements, wherein the second measurements are made from illuminance signals that represent the light levels sensed by the photocells at the second time;
   measuring, at the first node, light levels sensed by a nonempty first subset of the photocells at a third time, resulting in a plurality of third measurements, wherein the third measurements are made from illuminance signals that represent the light levels sensed by the photocells at the third time, wherein the first time, second time, and third time are different from one another, wherein the first subset is a proper subset of the photocells in the photocell array, and wherein the first subset of photocells comprises at least one photocell whose second measurement is greater than the corresponding first measurement;
   calculating a first value that is determined from at least one measurement in the plurality of third measurements; and
   transmitting an output signal that represents the first value.

9. The method of claim 8 wherein the first subset of photocells comprises all photocells whose second measurements are greater than the corresponding first measurements.

10. The method of claim 8 wherein the first subset of photocells consists of all photocells whose second measurements are greater than the corresponding first measurements.

11. The method of claim 8 wherein the first value is further determined based on the degree to which calibrated values of the third measurements of the light levels sensed by the first subset of the photocells are close in value to one another.

12. The method of claim 8 further comprising:
    generating a second signal level to turn off the light source, wherein the measuring of the light levels when the light source is off is performed subsequent to the generating of the second signal level.

13. A first node comprising:
    a photocell array comprising a plurality of photocells configured to sense light levels and to provide the plurality of illuminance signals that represent the light levels;
    a controller configured to:
    i) provide a control signal to a light source via a first signal path, wherein the control signal is effective to control the light level emitted by the light source,
    ii) measure light levels sensed by a nonempty first subset of the photocells in the photocell array at a third time, resulting in a plurality of measurements, wherein the measurements are made from illuminance signals received via a second signal path and that represent the light levels sensed by the photocells at the third time, wherein the first subset of photocells determined is based on light levels sensed by the photocells in the photocell array at a first time and at a second time, wherein the first, second, and third times are different from one another, and wherein the light source is on during at least one of the first, second, and third times;

iii) calculate the first value, wherein the first value is determined from a nonempty proper subset of the measurements, in the plurality of measurements, wherein the proper subset of the measurements is determined based on closeness in value of the measurements to one another; and a communication interface configured to transmit an output signal that represents the first value.

14. The first node of claim 13 wherein the controller is further configured to determine a difference between (i) light levels sensed by all of the photocells in the photocell array when the light source is off during the first time and (ii) light levels sensed by all of the photocells in the photocell array when the light source is on during the second time, wherein the first subset of photocells is based on the difference.

15. The first node of claim 13, further comprising the light source, wherein the light source is in communication with the controller via the first signal path.

16. The first node of claim 13 wherein the photocell array is a matrix of photocells.

17. The first node of claim 13 wherein the communication interface is further configured to transmit the first value to a second node, wherein the second node is physically distinct from the first node.

18. A method comprising:

measuring, at a first node, light levels sensed by a nonempty first subset of the photocells in a photocell array at a third time, resulting in a plurality of measurements, wherein the measurements are made from illuminance signals that represent the light levels sensed by the photocells at the third time, wherein the first subset of photocells is determined based on light levels sensed by the photocells in the photocell array at a first time and at a second time, wherein the first, second, and third times are different from one another, and wherein the light source is on during at least one of the first, second, and third times;

calculating a first value, wherein the first value is determined from a nonempty proper subset of the measurements, in the plurality of measurements, wherein the proper subset of the measurements is determined based on closeness in value of the measurements to one another; and transmitting an output signal that represents the first value.

19. The method of claim 18 further comprising determining a difference between (i) light levels sensed by all of the photocells in the photocell array when the light source is off during the first time and (ii) light levels sensed by all of the photocells in the photocell array when the light source is on during the second time, wherein the first subset of photocells is based on the difference.

20. The method of claim 18 further comprising transmitting the first value to a second node, wherein the second node is physically distinct from the first node.

* * * * *